United States Patent
Connor et al.

(10) Patent No.: US 7,359,865 B1
(45) Date of Patent: Apr. 15, 2008

(54) GENERATING A RISK ASSESSMENT REGARDING A SOFTWARE IMPLEMENTATION PROJECT

(75) Inventors: Douglas F. Connor, Frisco, TX (US); Sudipta Bhattacharya, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1089 days.

(21) Appl. No.: 09/992,283

(22) Filed: Nov. 5, 2001

(51) Int. Cl.
*G06F 17/30* (2006.01)

(52) U.S. Cl. .................................... 705/10; 705/7

(58) Field of Classification Search .............. 705/10, 705/7
See application file for complete search history.

(56) References Cited

U.S. PATENT DOCUMENTS

| | | | | |
|---|---|---|---|---|
| 5,798,950 | A * | 8/1998 | Fitzgerald | 703/17 |
| 6,219,805 | B1 * | 4/2001 | Jones et al. | 714/38 |
| 6,327,571 | B1 * | 12/2001 | Khayat et al. | 705/10 |
| 6,542,905 | B1 * | 4/2003 | Fogel et al. | 707/200 |
| 6,876,992 | B1 * | 4/2005 | Sullivan | 706/47 |
| 6,895,383 | B2 * | 5/2005 | Heinrich | 705/7 |
| 6,895,577 | B1 * | 5/2005 | Noble et al. | 717/126 |
| 6,957,227 | B2 * | 10/2005 | Fogel et al. | 707/102 |
| 7,006,992 | B1 * | 2/2006 | Packwood | 705/38 |
| 7,113,914 | B1 * | 9/2006 | Spielmann et al. | 705/7 |
| 2002/0059093 | A1 * | 5/2002 | Barton et al. | 705/10 |
| 2002/0147676 | A1 * | 10/2002 | Karmali | 705/38 |

(Continued)

FOREIGN PATENT DOCUMENTS

WO PCT/US00/13201 * 5/2000

OTHER PUBLICATIONS

"Identifying software project risks: An international Delphi study" by Roy Schmidt et al, Journal of Management Information, Spring 2001, vol. 17, issue 4.*

(Continued)

*Primary Examiner*—C. Michelle Tarae
(74) *Attorney, Agent, or Firm*—Booth Udall, PLC (57) ABSTRACT

A computer-implemented method for generating a risk assessment regarding a software implementation project includes accessing a previously specified importance value and maximum score for each of a multiple of risk factors. The importance value for each risk factor reflects experience of an implementing entity regarding the extent to which the factor may negatively impact a software implementation project if the factor is not adequately addressed, the importance value and maximum score for each factor being multiplied to define a potential weighted score for the factor. An actual score for a particular software implementation project is received for each factor based on an analysis specific to the particular project. An actual weighted score for the particular project is generated for each factor by multiplying the importance value and actual score for the factor, and a relationship between the potential weighted score and actual weighted score for each factor. A risk level for the particular project is assigned to each factor according to the relationship between the potential weighted score and the actual weighted score for the factor. The risk level for each factor represents an assessment regarding the extent to which the factor may negatively impact the particular project if the factor is not adequately addressed. A risk assessment is generated for the particular project including one or more of the assigned risk levels for the particular project for one or more corresponding factors.

26 Claims, 6 Drawing Sheets

U.S. PATENT DOCUMENTS

| | | | |
|---|---|---|---|
| 2002/0198750 A1* | 12/2002 | Innes et al. | 705/7 |
| 2003/0009373 A1* | 1/2003 | Ensing et al. | 705/10 |
| 2003/0037063 A1* | 2/2003 | Schwartz | 707/104.1 |
| 2003/0061246 A1* | 3/2003 | Bowman et al. | 707/204 |
| 2004/0186762 A1* | 9/2004 | Beaven et al. | 705/8 |
| 2005/0114186 A1* | 5/2005 | Heinrich | 705/7 |

OTHER PUBLICATIONS

"Software Metrics: Roadmap" by Norman Fenton et al, Future of Software Engineering, Limerick, Ireland, Copyright 2000.*

"The balanced scorecard: a foundation for the strategic management of information systems" by Martinsons et al, Decision Support Systems, 1999, pp. 71-88.*

"Instinct and Value in IT Investment Decisions" by Bannister et al, Occasional Paper Series, 1999.*

"Palisade @ Risk 4.0-New tools, new speed, tighter fit with Excel; Major upgrade in best-selling decision-support tool now shipping", M2 Presswire, May 17, 2000.*

"@Risk arms Excel with risk analysis" by Hammond, InfoWorld, Mar. 20, 2000.* webarchive of www.palisade.com from the year 2000 (10 pages), @Risk 4.0.*

"Project Risk Assessment using the Analytic Hierarchy Process" by Mustafa et al, IEEE, 1991.*

"Risk factors in enterprise wide information management systems projects" by Sumner, Proceedings of the 2000 ACM SIGCPR Conference on Computer Personnel research, 2000.*

"Risk Management in Information Systems: Problems and Potential" Smith et al, Communications of the Association for Information Systems, Aug. 2001.*

Dawood, Nashwan. "Estimating project and activity duration: a risk management approach using network analysis," Construction Management and Economics, 1998.*

Howard Solomon, "Year 2000 bug embedded deep in hidden places", Computing Canada, 1 page, Mar. 23, 1998.

Mark Keil, Paul E. Cule, Kalle Lyytinen, and Roy C. Schmidt, "A Framework for Identifying Software Project Risks," Nov. 1998/vol. 41. No. 11, Communications of the ACM , 8 pages, Nov. 1998.

Chris Vandersluis, "Plan is key to avoiding IT project failures," Computing Canada, 1 page, Apr. 28, 1997.

David J. Gardner CMC, "How to Avoid IT Project Failures," Consulting To Management, vol. 11, No. 1, May 2000, 3 pages, May 2000.

Mark Keil and Daniel Robey, "Turning Around Troubled Software Projects: An Exploratory Study of the Deescalation of Commitment to Failing Courses of Action," Journal of Management Information Systems/ Spring 1999, vol. 15, No. 4, pp. 63-87, © 1999 M.E. Sharpe, Inc., 25 pages, Spring 1999.

Christopher Deephouse, Tridas Mukhopadhyay, Dennis R. Goldenson, and Marc I. Kellner, "Software Processes and Project Performance," Journal of Management Information Systems/ Winter 1995-96, vol. 12 No. 3, pp. 187-205, Copyright ® 1996 M.E. Sharpe, Inc., 19 pages, Winter 1995-1996.

K.D. Maxwell, R.J. Kusters, "Software project control and metrics," Information And Software Technology, Information and Software Technology 42 (2000) 963-964, © 2000 Elsevier Science B.V. All rights reserved, 2 pages, © 2000.

Kurt R. Linberg, "Software developer perceptions about software project failure; a case study," The Journal of Systems and Software 49 (1999) 177-192, Walden University, 6328 Eden Prairie Road, Eden Prairie, MN 55346, USA Received Nov. 7, 1998; received in revised form Nov. 29, 1998; accepted Feb. 10, 1999, © 1999 Elsevier Science Inc. All rights reserved, 16 pages, © 1999.

* cited by examiner

| | RISK ASSESSMENT COMPONENT | IMPORTANCE VALUE | MAXIMUM SCORE | ACTUAL SCORE | POTENTIAL WEIGHTED SCORE | ACTUAL WEIGHTED SCORE | RISK LEVEL |
|---|---|---|---|---|---|---|---|
| | | 28 | 30 | 32 | 34 | 36 | 38 |
| RISK FACTOR CATEGORY 1 | | | | | | | |
| 1 | RISK FACTOR 1.1 | 10 | 10 | 9 | 100 | 90 | LOW |
| 2 | RISK FACTOR 1.2 | 10 | 10 | 9 | 100 | 90 | LOW |
| 3 | ⋮ | 10 | 10 | 8 | 100 | 80 | LOW |
| 4 | RISK FACTOR 1.n | 10 | 10 | 7 | 100 | 70 | MEDIUM |
| RISK FACTOR CATEGORY 2 | | | | | | | |
| 5 | RISK FACTOR 2.1 | 10 | 10 | 6 | 100 | 60 | MEDIUM |
| 6 | RISK FACTOR 2.2 | 9 | 10 | 6 | 90 | 54 | MEDIUM |
| 7 | ⋮ | 9 | 10 | 7 | 90 | 63 | MEDIUM |
| 8 | RISK FACTOR 2.n | 8 | 10 | 7 | 80 | 56 | MEDIUM |
| RISK FACTOR CATEGORY N | | | | | | | |
| | RISK FACTOR N.1 | | | | | | |
| | ⋮ | | | | | | |
| | RISK FACTOR N.n | | | | | | |

| PROJECT PERCENTAGE RISK | X% |

FIG. 3A

LEADERSHIP — 24a

| | | | | | | | |
|---|---|---|---|---|---|---|---|
| | 1 | CxO VISION AND COMMITMENT | 10 | 10 | 9 | 100 | 90 | LOW |
| 26a | 2 | EXECUTIVE SPONSOR COMMITMENT | 10 | 10 | 9 | 100 | 90 | LOW |
| | 3 | CORPORATE MANAGEMENT OF COMPANY ACTIONS IN PROGRESS | 10 | 10 | 8 | 100 | 80 | LOW |
| | 4 | END USER INVOLVEMENT, BUY-IN, AND COMMITMENT | 10 | 10 | 7 | 100 | 70 | MEDIUM |

FIG. 3B

CHANGE MANAGEMENT — 24b

| | | | | | | | |
|---|---|---|---|---|---|---|---|
| | 5 | CHANGE MANAGEMENT AND CULTURE CHANGE PLANS CAPABILITY | 9 | 10 | 8 | 90 | 72 | LOW |
| | 6 | LINKAGE OF PROJECT TO COMPENSATION (ACCOUNTABILITY) | 9 | 10 | 8 | 90 | 72 | LOW |
| | 7 | ABILITY TO DRIVE TOP-DOWN CHANGE | 9 | 10 | 6 | 90 | 54 | MEDIUM |
| 26b | 8 | CLARITY OF ROLES AND RESPONSIBILITIES | 8 | 10 | 7 | 80 | 56 | MEDIUM |
| | 9 | COMMITMENT TO TRAIN ALL PARTIES | 8 | 10 | 5 | 80 | 40 | HIGH |
| | 10 | ORGANIZATION DESIGN AND INTERNAL ALIGNMENT | 7 | 10 | 7 | 70 | 49 | MEDIUM |
| | 11 | CORPORATE CULTURE OF RIGOR AND DISCIPLINE | 7 | 10 | 3 | 70 | 21 | HIGH |

FIG. 3C

RESOURCE MANAGEMENT — 24c

| | | | | | | | |
|---|---|---|---|---|---|---|---|
| | 12 | STAFF COMPETENCY | 9 | 10 | 8 | 90 | 72 | LOW |
| | 13 | EXECUTIVE SPONSOR SUPPORT BY CxO | 9 | 10 | 6 | 90 | 54 | MEDIUM |
| 26c | 14 | ADEQUATE PROJECT RESOURCES, STAFFING | 8 | 10 | 5 | 80 | 40 | HIGH |
| | 15 | ADEQUATE PROJECT PLANNING SKILLS | 8 | 10 | 5 | 80 | 40 | HIGH |
| | 16 | KEY EMPLOYEE TURNOVER (HISTORICAL AND CURRENT) | 7 | 10 | 6 | 70 | 42 | MEDIUM |

FIG. 3D

SCOPE MANAGEMENT — 24d

| | | | | | | |
|---|---|---|---|---|---|---|
| 17 | UNDERSTANDING OF COMPREHENSIVE BR PLAN | 10 | 10 | 6 | 100 | 60 | MEDIUM |
| 18 | EXPECTATIONS ON WHAT THE SOLUTION WILL DO/NOT DO | 9 | 10 | 6 | 90 | 54 | MEDIUM |
| 19 | SPECIFICATIONS AND WORKFLOWS DEFINITIONS | 9 | 10 | 7 | 90 | 63 | MEDIUM |
| 20 | TEAM VISION, STRATEGY AND OBJECTIVES | 8 | 10 | 7 | 80 | 56 | MEDIUM |

TECHNOLOGY MANAGEMENT — 24e

| | | | | | | |
|---|---|---|---|---|---|---|
| 21 | DATA INTEGRITY | 8 | 10 | 8 | 80 | 64 | LOW |
| 22 | SOLUTION MATURITY | 8 | 10 | 8 | 80 | 64 | LOW |
| 23 | CUSTOMIZATION PLAN UNDERSTANDING/ACCEPTANCE | 8 | 10 | 5 | 80 | 40 | HIGH |
| 24 | INTEGRATION CHALLENGES | 7 | 10 | 9 | 70 | 63 | LOW |
| 25 | HARDWARE COMMITMENT/AVAILABILITY | 7 | 10 | 8 | 70 | 56 | LOW |

IMPLEMENTATION MANAGEMENT — 24f

| | | | | | | |
|---|---|---|---|---|---|---|
| 26 | TEAM COMMITMENT TO VALUE ASSURANCE PROCESS | 9 | 10 | 5 | 90 | 45 | HIGH |
| 27 | PROVEN BUDGET ADHERENCE ABILITY | 8 | 10 | 8 | 80 | 64 | LOW |
| 28 | WELL PLANNED SOLUTION REVIEW AND DOCUMENTATION SCHEDULE | 8 | 10 | 8 | 80 | 64 | LOW |
| 29 | PROJECT TEAM AND CLIENT WIDE COMMUNICATION | 8 | 10 | 8 | 80 | 64 | LOW |
| 30 | PROVEN SCHEDULE ADHERENCE ABILITY | 7 | 10 | 9 | 70 | 63 | LOW |

| | RISK FACTOR CATEGORIES | CATEGORY ACTUAL SCORE | CATEGORY MAXIMUM SCORE | CATEGORY PERCENTAGE RISK |
|---|---|---|---|---|
| 1 | ALIGNED OBJECTIVES | 50 | 130 | 38% |
| 2 | CHANGED MANAGEMENT | 90 | 360 | 25% |
| 3 | DATA AND INTEGRATION | 190 | 360 | 53% |
| 4 | ECONOMIC AND FINANCIAL ENVIRONMENT | 80 | 110 | 73% |
| 5 | LEADERSHIP | 115 | 280 | 41% |
| 6 | PROJECT MANAGEMENT | 155 | 350 | 44% |
| 7 | SCOPE AND EXPECTATION MANAGEMENT | 220 | 220 | 100% |
| 8 | SOLUTION QUALITY AND MATURITY | 160 | 280 | 57% |
| 9 | TEAM AND INFRASTRUCTURE | 285 | 730 | 39% |
| 10 | VALUE FOCUS | 150 | 290 | 52% |

FIG. 5

GENERATING A RISK ASSESSMENT REGARDING A SOFTWARE IMPLEMENTATION PROJECT

TECHNICAL FIELD OF THE INVENTION

This invention relates generally to software implementation projects and more particularly to generating a risk assessment regarding a software implementation project.

BACKGROUND OF THE INVENTION

Numerous independent studies have shown that software implementation projects are often extremely complex and regularly fail to deliver the value promised. The success of a software implementation project may be measured by factors such as timely completion and actual implementation of features and functionality promised. When software implementation projects are completed late, over budget, or with fewer features and functions than planned, they are subject to challenge by a client. In the worst cases of failure, the software implementation project may be cancelled or the software may go unused. Poor implementations lead to poor customer referenceability and, therefore, hurt sales. Additionally, setting improper expectations for a software implementation project makes it less likely that the implemented software will actually fulfill the customer's needs. These pitfalls may have a significant impact on the bottom line performance of a software company.

SUMMARY OF THE INVENTION

According to the present invention, disadvantages and problems associated with previous techniques for managing software implementation projects may be reduced or eliminated.

In one embodiment of the present invention, a computer-implemented method for generating a risk assessment regarding a software implementation project includes accessing a previously specified importance value and maximum score for each of a number of risk factors. The importance value for each risk factor reflects experience of an implementing entity regarding the extent to which the risk factor may negatively impact a software implementation project if the risk factor is not adequately addressed, the importance value and maximum score for each risk factor being multiplied to define a potential weighted score for the risk factor. An actual score for a particular software implementation project is received for each risk factor based on an analysis by the implementing entity specific to the particular software implementation project. An actual weighted score for the particular software implementation project is generated for each risk factor by multiplying the importance value and actual score for the risk factor, and a relationship between the potential weighted score and actual weighted score is determined for each risk factor. A risk level for the particular software implementation project is assigned to each risk factor according to the relationship between the potential weighted score and the actual weighted score for the risk factor. The risk level for each risk factor represents an assessment regarding the extent to which the risk factor may negatively impact the particular software implementation project if the risk factor is not adequately addressed. A risk assessment is generated for the particular software implementation project including one or more of the assigned risk levels for the particular software implementation project for one or more corresponding risk factors.

Particular embodiments of the present invention may provide one or more technical advantages. In certain embodiments, the risk assessment process facilitates consistent comparison of one software implementation project to other software implementation projects and provides a mechanism for measuring improvement across software implementation projects. For example, in certain embodiments of the present invention, actual weighted scores for a particular software implementation project for one or more risk factors, which represent key performance indicators, within one or more risk factor categories may be compared with potential weighted scores, which represent predetermined benchmarks for those risk factors. As a result of the comparison, particular risk factors and risk factor categories critical to the success of the particular software implementation project may be determined, presented to the client or other stakeholders in a formal manner for agreement in the sales or other pre-implementation stage, and closely monitored throughout the implementation process. This may allow potential gaps in preparation for the software implementation project to be proactively identified and then managed accordingly. This may also allow the client and the software implementing entity to focus more clearly on the key potential barriers to a successful implementation and readily identify where any value "leakage" has occurred or may occur, along with potential root causes that could derail the software implementation project.

Generating a risk assessment according to certain embodiments of the present invention may provide one or more technical advantages for the implementing entity. For instance, such a risk assessment may reduce the disconnect between sales and implementation teams by creating clear expectations and improving communication between the two teams. Such a risk assessment may help shelter the implementing entity from unwarranted responsibility for an unsuccessful implementation. For example, where the client has been fully informed of key risk factors beforehand and has acknowledged those risk factors and its responsibilities in relation to those risk factors, it may be much more difficult for the client to improperly shift blame to the implementing entity if the client's failure to adequately address one or more of those risk factors is indeed the primary cause of the unsuccessful implementation. Risk mitigation should be a goal of software implementing entities because it often increases customer referenceability, a key to future license sales. Risk assessment according to certain embodiments of the invention may facilitate achievement of this goal, along with the ultimate aim of increasing software implementing success for clients by taking a proactive approach to value delivery. To further advance the goal of bringing quality to the customer, a risk assessment may be generated as part of a larger strategic opportunity assessment associated with the software product.

Particular embodiments may provide some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF EXAMPLE EMBODIMENTS

Figure 1:
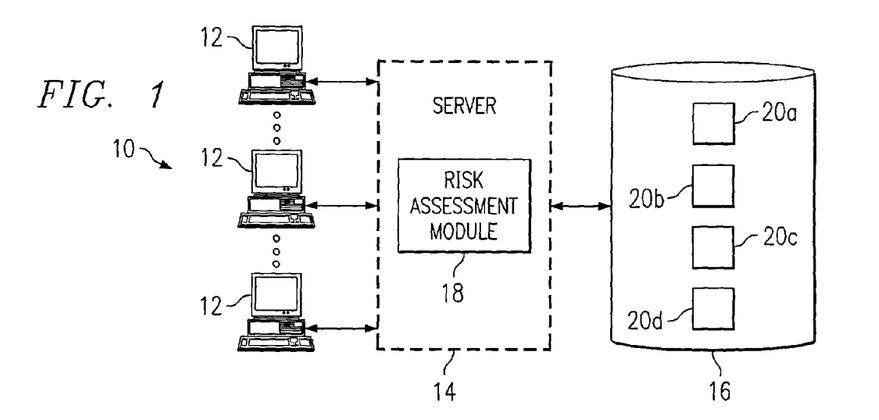
FIG. 1 illustrates an example system for generating a risk assessment regarding a software implementation project.

FIG. 1 illustrates an example system 10 for generating a risk assessment regarding a software implementation project. System 10 may include one or more client systems 12 coupled to a server system 14, which is coupled to an object-oriented or other suitable database system 16. In one embodiment, server system 14 supports a risk assessment module 18 and database system 16 includes one or more object classes 20 from which various objects may be generated in generating risk assessments according to the present invention. Risk assessment module 18 may access object classes 20 to create, access, manipulate, or otherwise interact with particular objects associated with a risk assessment for a particular software implementation project according to one or more parameters or other inputs received from a user associated with a client system 12.

For example, object class 20a may represent a list of risk factor categories and risk factors that are preferably predetermined in whole or in part by a software implementing entity primarily responsible for the particular software implementation project. Each risk factor category may include one or more constituent risk factors. In determining the risk factor categories and constituent risk factors, the implementing entity may rely on its experience in conducting software implementations and may include those risk categories and risk factors that, in its professional judgment, can threaten the success of an implementation. The implementing entity may also consult the current client or one or more previous clients in the selection of risk factor categories and constituent risk factors and may consider such variables as the business culture in which the client operates. In one embodiment, risk factor categories and risk factors may be customized in whole or in part by a user associated with a client system 12 according to particular needs.

Object class 20b may represent importance values and maximum scores for each of the various risk factors associated with object class 20a, also preferably predetermined in whole or in part by the implementing entity. Importance values and maximum scores may be assigned, for example, based on a scale of one to ten or in any other suitable manner. In one embodiment, the assigned importance value for a risk factor reflects the experience of the implementing entity regarding the extent to which the risk factor may negatively impact a software implementation project if the risk factor is not adequately addressed. The maximum score is preferably the same value for each risk factor associated with a risk assessment for a particular software implementation project and is also constant across risk assessments for substantially all software implementation projects. The importance value and maximum score for each risk factor may be multiplied to obtain a potential weighted score for each risk factor, which may also be stored in association with object class 20b. This calculation may be performed by one or more scripts or other software components associated with risk assessment module 18 that may interact with object classes 20 and objects generated from object classes 20 to manipulate data and make calculations or perform other appropriate operations. Such software components may be executed by hardware associated with server system 14, database system 16, or other devices internal or external to system 10 for executing software.

Object class 20c may represent inputs received from a user via a client system 12 pertinent to a particular software implementation project, including an actual score for the particular software implementation for each risk factor that is assigned by the implementing entity following an appropriate analysis of client resources and capabilities relevant to the risk factor. Actual scores may be assigned based on a scale of one to ten or in any other suitable manner, preferably according to the same scale as maximum scores. In determining the actual score for a risk factor, the implementing entity may use its experience in conducting numerous previous software implementations to evaluate the client, with respect to the risk factor, relative to previous clients for which implementations were successfully completed. The importance value and actual score for each risk factor may be multiplied to obtain an actual weighted score for the risk factor, which may also be stored in association with object class 20c. As described more fully below with reference to FIG. 2, the actual weighted score and potential weighted score for each risk factor may be compared to determine a relationship between the two, which may in turn correspond to a risk level for the risk factor. These calculations may be performed by one or more scripts or other software components associated with risk assessment module 18 that may interact with object classes 20 and objects generated from object classes 20 to manipulate data and make calculations or perform other appropriate operations. Such software components may be executed by hardware associated with server system 14, database system 16, or other devices internal or external to system 10 for executing software.

Object class 20d may relate the information of object classes 20a, 20b, and 20c, for example, in the form of a risk assessment scorecard for the particular software implementation project. In one embodiment, a risk assessment scorecard is generated for each particular software implementation project in spreadsheet format and includes the risk factor categories; the one or more risk factors for each risk factor category; and the importance value, maximum score, potential weighted score, actual score, actual weighted score, and the risk level for each risk factor. Object class 20d may also relate information regarding the risk factor categories in a risk factor category scorecard. In one embodiment, a risk factor category scorecard is generated for each particular software implementation project and includes the risk factor categories, category actual scores, category maximum scores, and category percentage risks. Object class 20d may also further relate information regarding the risk factor categories in a risk factor category spider chart, which displays the category percentage risk for each risk factor category in a spider chart format.

The one or more client systems 12, server system 14, and database system 16 may each include one or more computers at one or more locations and may share data storage, communications, or other resources according to particular needs. For example, functionality described in connection with client system 12, server system 14, and database system 16 may be provided using a single computer system, which in a particular embodiment might include a conventional desktop or laptop computer. Furthermore, functionality described in connection with client system 12, server system 14, and database system 16 may be provided using any suitable software components, for example, using a commercial off-the-shelf (COTS) spreadsheet program in a particular embodiment. Each computer system may include one or more suitable input devices, output devices, mass storage media, processors, memory, or other components for receiving, processing, storing, and communicating information according to the operation of system 10. The one or more client systems 12 may interact with server system 14 according to suitable input from any number of associated users. The one or more client systems 12 may be coupled to server system 14 using one or more local area networks (LANs), metropolitan area networks (MANs), wide area networks (WANs), a global computer network such as the Internet, or any other wireline, optical, wireless, or other links. Although described as a database, database system 16 may include any suitable data storage arrangement. For example, in a particular embodiment in which functionality of client system 12, server system 14, and database system 16 are provided using a single computer system, database system 16 might be implemented using a memory of the computer system.

In operation of system 10, a user associated with the implementing entity specifies risk factor categories and their constituent risk factors, and risk assessment module 18 stores these inputs in database system 16, for example, in association with object class 20a. Risk factor categories and constituent risk factors may be specified independent of any risk assessment for a particular software implementation project, for example, where risk factor categories and risk factors are the same across all software implementation projects. The same or a different user specifies the importance values and maximum scores for each risk factor, and risk assessment module 18 stores these inputs in database system 16, for example, in association with object class 20b. The same or a different user specifies the actual score for each risk factor, and risk assessment module 18 stores the actual scores in database system 16, for example, in association with object class 20c. Where appropriate, certain risk factor categories and their constituent risk factors may be evaluated differently in different business cultures. Information used in generating the risk assessment for the particular software implementation project may be provided by one or more users in one or more sessions, according to particular needs.

In one embodiment, risk assessment module 18 accesses appropriate data stored in database system 16, in association with object classes 20a, 20b, and 20c for example, to calculate a potential weighted score and an actual weighted score for each risk factor, stores the potential weighted scores in database system 16, for example, in association with class 20b, and stores actual weighted scores in database system 16, for example, in association with object class 20c. Risk assessment module 18 accesses the potential weighted score and actual weighted score for each risk factor to determine a relationship between these values for purposes of assigning a risk level to each risk factor. In one embodiment, this relationship is determined by calculating the difference between the potential weighted score and the actual weighted score, which may be referred to as the calculated risk. The calculated risk may be divided by the potential weighted score for the risk factor to determine a risk ratio, that risk ratio being multiplied by one hundred to determine a percentage risk for the risk factor. Each percentage risk may be used by risk assessment module 18 to determine a risk level for the corresponding risk factor, which risk assessment module 18 stores in database system 16, for example, in association with object class 20c. For example, the percentage risk for a risk factor may fall within a range of percentage risks corresponding to a particular risk level according to a predetermined scale.

Risk assessment module 18 may calculate the sum of the actual scores for all risk factors within a risk factor category to determine a category actual score and may calculate the sum of the maximum scores for all risk factors within a risk factor category to determine a category maximum score. The difference between the category maximum score and the category actual score may be calculated, the quotient of that difference and the category maximum score may be determined, and that quotient may be multiplied by one hundred to determine a category percentage risk for each risk factor category, which risk assessment module 18 may store in database system 16, for example, in association with object class 20d. Risk assessment module 18 may also calculate the sum of the actual scores for all risk factors in all risk factor categories to determine a project actual score and may calculate the sum of the maximum scores for all risk factors in all risk factor categories to determine a project maximum score. By subtracting the project actual score from the project maximum score, dividing the resulting difference by the project maximum score, and multiplying the resulting quotient by one hundred, risk assessment module 18 may calculate a project percentage risk and store this value in database system 16, for example, in association with object class 20d. Project percentage risk may be calculated for any number of risk factors in any combination for a particular risk assessment. Risk assessment module 18 may generate risk assessment results in one or more appropriate formats, including, for example, in spreadsheet format within a risk assessment scorecard.

Particular embodiments of the present invention may provide one or more technical advantages. In certain embodiments, the risk assessment process facilitates consistent comparison of one software implementation project to other software implementation projects and provides a mechanism for measuring improvement across software implementation projects. For example, in certain embodiments of the present invention, actual weighted scores for a particular software implementation project for one or more risk factors, which represent key performance indicators, within one or more risk factor categories may be compared with potential weighted scores, which represent predetermined benchmarks for those risk factors. As a result of the comparison, particular risk factors and risk factor categories critical to the success of the particular software implementation project may be determined, presented to the client or other stakeholders in a formal manner for agreement in the sales or other pre-implementation stage, and closely monitored throughout the implementation process. This may allow potential gaps in preparation for the software implementation project to be proactively identified and then managed accordingly. This may also allow the client and the software implementing entity to focus more clearly on the key potential barriers to a successful implementation and readily identify where any value "leakage" has occurred or may occur, along with potential root causes that could derail the software implementation project.

Generating a risk assessment according to certain embodiments of the present invention may provide one or more technical advantages for the implementing entity. For instance, such a risk assessment may reduce the disconnect between sales and implementation teams by creating clear expectations and improving communication between the two teams. Such a risk assessment may help shelter the implementing entity from unwarranted responsibility for an unsuccessful implementation. For example, where the client has been fully informed of key risk factors beforehand and has acknowledged those risk factors and its responsibilities in relation to those risk factors, it may be much more difficult for the client to improperly shift blame to the implementing entity if the client's failure to adequately address one or more of those risk factors is indeed the primary cause of the unsuccessful implementation. Risk mitigation should be a goal of software implementing entities because it often increases customer referenceability, a key to future license sales. Risk assessment according to certain embodiments of the invention may facilitate achievement of this goal, along with the ultimate aim of increasing software implementing success for clients by taking a proactive approach to value delivery. To further advance the goal of bringing quality to the customer, a risk assessment may be generated as part of a larger strategic opportunity assessment associated with the software product.

Figure 2:
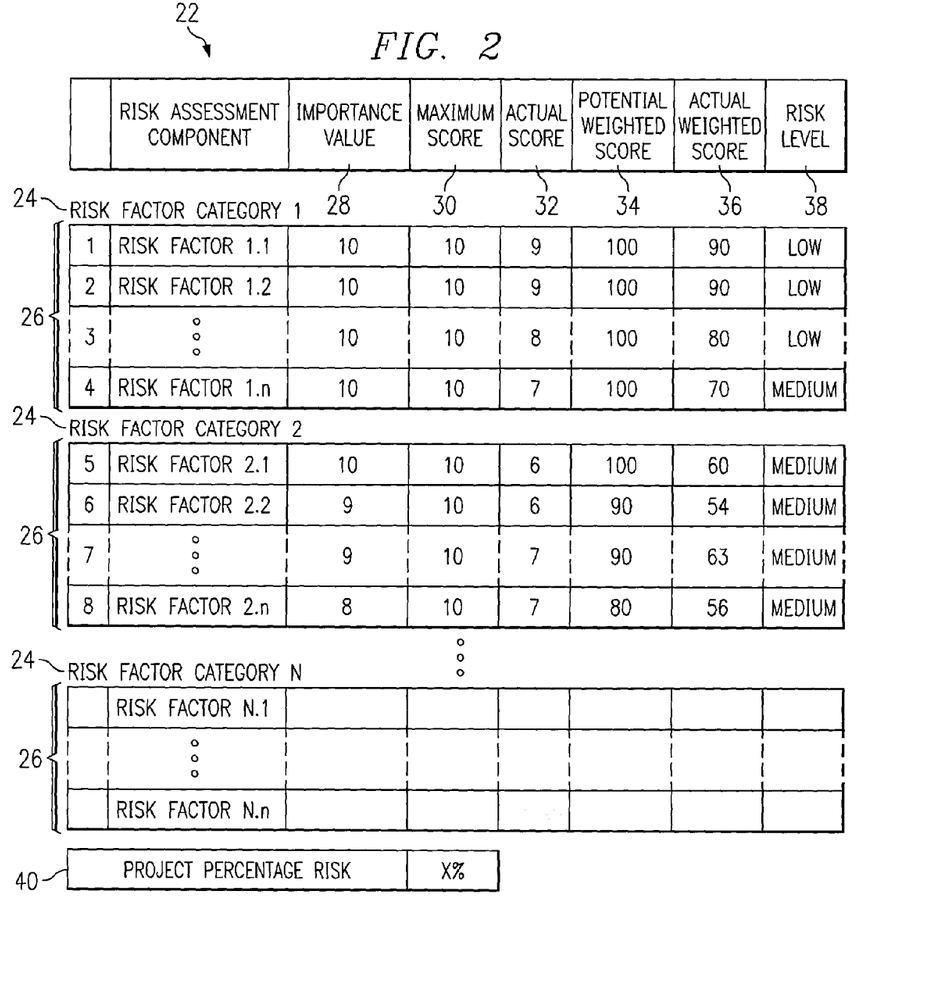
FIG. 2 illustrates an example risk assessment scorecard.

FIG. 2 illustrates an example generic risk assessment scorecard 22, in that no particular risk factor category or constituent risk factors are specified, unlike the case for a usable risk assessment scorecard 22 such as the example risk assessment scorecard 22 described below with reference to FIG. 3. In general, risk assessment scorecard 22 provides a concise display of the input data, calculated data, and results of a risk assessment for a particular software implementation. Risk assessment scorecard 22 may identify a number of risk factor categories 24. Each risk factor category 24 may be associated with one or more rows, each corresponding to a particular risk factor 26 within the risk factor category 24. Risk factor categories 24 and their constituent risk factors 26, as described above with reference to FIG. 1, may be predetermined by the implementing entity based on its experience with previous software implementation projects. Risk factors 26 preferably specify key performance indicators for a successful software implementation and, conversely, issues that can negatively impact a software implementation project if not adequately addressed. The implementing entity determines risk factor categories 24 and risk factors 26 in an effort to proactively identify and facilitate mitigation of specific areas that may potentially jeopardize the success of a software implementation project, taking into account various factors such as the business culture in which a client operates.

Risk assessment scorecard 22 may also include a number of columns. Although columns of risk assessment scorecard 22 are described in a particular order, columns may occur in any suitable order according to particular needs. In one embodiment, a first column may include risk factors 26 in one or more risk factor categories 24 and for which information is provided in remaining columns of risk assessment scorecard 22. A second column may include an importance value 28 for each risk factor 26, importance value 28 being determined in any suitable manner. In one embodiment, the implementing entity establishes the importance value 28 for each risk factor 26 (e.g., on a scale of one to ten) based on its experience with previous software implementation projects. Importance value 28 may represent the extent to which the risk factor 26 may negatively impact a software implementation project if the risk factor 26 is not adequately addressed. A third column may include a maximum score 30 for each risk factor 26, maximum score 30 being determined in any suitable manner. In one embodiment, the implementing entity may establish the same maximum score 30 for all risk factors 26 (e.g., on a scale of one to ten) to maintain consistency throughout the risk assessment for the particular software implementation project. Importance value 28 and maximum score 30 for a particular risk factor 26 preferably remain constant across risk assessments for substantially all software implementation projects to allow more meaningful analysis and comparison of the results generated using these values. As described below, this approach provides the benefit of a benchmark score against which actual client values can be consistently and reliably compared.

A fourth column may include an actual score 32 for each risk factor 26 for the particular software implementation project. In one embodiment, actual scores 32 are determined by the implementing entity for the particular software implementation project and entered via client system 12. Actual score 32 for a risk factor 26 may be based on evaluations of client resources and capabilities, including such things as structured interviews of client personnel, review of documentation and processes, and any other suitable information. A fifth column may include a potential weighted score 34 for each risk factor 26. In one embodiment, potential weighted score 34 for a risk factor 26 is the product of importance value 28 and maximum score 30 for the risk factor 26 and is thus essentially predetermined by the implementing entity. As described above, this approach preferably provides the benefit of a benchmark score against which actual client values may be consistently and reliably compared, particularly if the maximum score 30 and importance value 28 for each risk factor 26 are held constant across substantially all software implementation projects. A sixth column may include an actual weighted score 36 for each risk factor 26 for the particular software implementation project. In one embodiment, actual weighted score 36 for a risk factor 26 is the product of importance value 28 and actual score 32 for the risk factor 26, thereby defining a value that can be compared with potential weighted score 34 to assess risk associated with the risk factor 26 for the particular software implementation project.

A seventh column may include a risk level 38 for each risk factor 26 for the particular software implementation project. In one embodiment, possible risk levels 38 include low, medium, and high, although any suitable risk levels 38 may be defined according to particular needs. Risk level 38 for a risk factor 26 may be determined by comparing potential weighted score 34 to actual weighted score 36 for the risk factor 26 to determine a relationship between the potential weighted score 34 and actual weighted score 36. For example, the relationship between potential weighted score 34 and actual weighted score 36 may be determined by computing a calculated risk as the difference between potential weighted score 34 and actual weighted score 36. A risk ratio may be determined by calculating the quotient of the calculated risk and potential weighted score 34, and a risk level 38 may be assigned by multiplying the risk ratio by one hundred and comparing the resulting percentage risk to a predetermined scale that relates ranges of such percentage risks to risk levels 38. The calculated risks, risk ratios, and percentage risks may be included as additional columns displayed in risk assessment scorecard 22 or may be calculated internally but not displayed. As another example, the relationship between potential weighted score 34 and actual weighted score 36 may be determined by calculating the quotient of actual weighted score 36 and potential weighted score 34, subtracting this quotient from one and multiplying the resulting difference by one hundred to determine a percentage risk for a risk factor 26, and assigning a corresponding risk level 38 to the risk factor 26 according to a predetermined scale that relates ranges of such percentage risks to risk levels 38. Although a particular technique for determining risk levels 38 for risk factors 26 is described by way of example, the present invention contemplates assigning risk levels 38 in any suitable manner.

Risk assessment scorecard 22 may also include a project percentage risk 40. In one embodiment, as described above, project percentage risk 40 provides a measure of the overall likelihood of, or risk to, a successful implementation. To calculate project percentage risk, in one embodiment, risk assessment module 18 computes the sum of all actual scores for all risk factors 26 in all risk factor categories 24 to determine the project actual score and computes the sum of all maximum scores for all risk factors 26 in all risk factor categories 24 to determine the project maximum score. By subtracting the project actual score from the project maximum score, dividing the resulting difference by the project maximum score, and multiplying by one hundred, risk assessment module 18 may calculate project percentage risk 40. A category percentage risk (not shown) may similarly be provided for one or more particular risk factor categories 24, representing computation for all risk factors 26 within risk factor category 24. Although particular techniques are described by way of example, the present invention contemplates aggregating percentage risks for multiple risk factors 26 in any suitable manner.

Figure 3A:
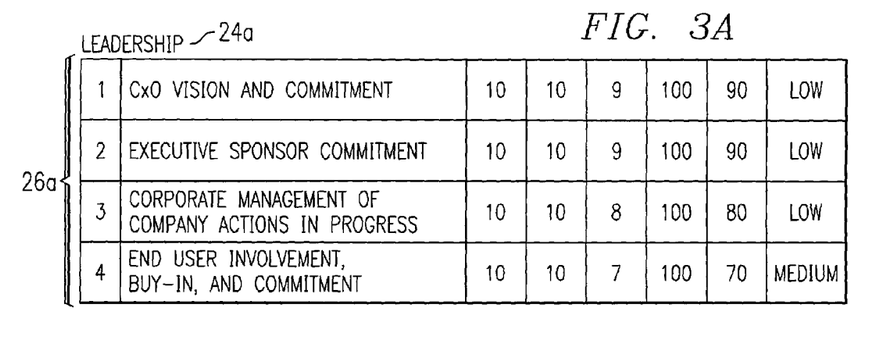
FIGS. 3A through 3F illustrate example risk assessment scorecard entries for certain example risk factor categories and example constituent risk factors.

FIGS. 3A through 3F illustrate more specific examples for inclusion in risk assessment scorecard 22 in certain embodiments. FIG. 3A illustrates information pertaining to example risk factors 26a within an example "Leadership" risk factor category 24a. In the illustrated example embodiment, risk factors 26a may include CEO, CIO, or other high level executive (C×O) vision and commitment; executive sponsor commitment; corporate management of company actions in progress; end user involvement, buy-in, and commitment; or any other suitable risk factors 26a in any suitable combination. For example, C×O vision and commitment risk factor 26a might reflect whether the degree of executive involvement is clearly laid out; whether an executive dashboard for specific quarterly or other time periods is identified; whether the executive team makes itself available to the software implementing entity's sales team and is willing to devote time to driving the implementation of the changes; whether executive compensation is linked to the success of the implementation; whether executives are willing to publicly endorse the initiative; whether there is alignment among the executive leadership team on the initiative; or any other suitable considerations.

Executive sponsor commitment risk factor 26a might reflect whether one or more executive sponsors are firmly convinced of the implementing entity's solution capability; whether expectations of sponsor involvement and ownership are clearly laid out; whether executive sponsors will allocate at least twenty percent of their time to the effort; whether executive sponsors will be measured and incented by the amount of actual value that results from the implementation; whether executive sponsors are willing to bet their careers on the success of the initiative; whether executive sponsors are inspired and excited about the initiative; whether executive sponsors are passionate, influential leaders of change; or any other suitable considerations.

Corporate management of company actions risk factor 26a might reflect whether project resource allocation is properly balanced with competing initiatives; whether executives understand the concept of managing corporate actions in progress; whether executives are willing to limit the corporate actions in progress to a manageable level; whether there is a process to manage the ongoing, active, and backlog list of corporate actions in progress; whether the technology initiative will remain on the active and important list of corporate actions in progress; or any other suitable considerations.

End user involvement, buy-in, and commitment risk factor 26a might reflect whether there is proactive support from marketing companies and dealers; whether end user inputs are being involved in the decision making process; whether the possible need for new end users and redeployment of some end users is emphasized; whether end user inputs are being heavily weighted in the decision making process; whether end users are supportive of the decisions; whether end users are excited about the technology initiative; whether end users are committed to the success of the technology initiative, or any other suitable considerations.

The software implementing entity may adjust the risk factors 26 within a particular risk factor category 24 among software implementations to account for variables such as the business culture in which a client operates. For instance, example "Leadership" risk factor category 24a may contain different risk factors 24a for clients in Japan than clients in the United States to reflect the typical emphasis in Japanese companies on a consensus form of leadership. Such flexibility in the risk assessment process may help ensure a more accurate and meaningful evaluation of the potential risk in a software implementation project.

As an illustration of how information within risk assessment scorecard 22 might be generated in the context of a risk assessment for a particular software implementation project, consider executive sponsor commitment risk factor 26a as an example. In this example, executive sponsor commitment risk factor 26a received an importance value 28 of ten, which in one embodiment is the only importance value 28 a risk factor 26 can be assigned and is preferably the same for this risk factor 26a across all software implementation projects. Executive sponsor commitment risk factor 26a also received a maximum score 30 of ten, which in one embodiment is the only maximum score 30 a risk factor 26 can be assigned and is preferably the same for all risk factors 26 across all risk factor categories 24 and across all software implementation projects. Executive sponsor commitment risk factor 26a received an actual score 32 of nine. As described above, the implementing entity may determine actual score 32 for the particular software implementation project based on its evaluation of client resources and capabilities, including such things as structured interviews of client personnel, review of documentation and processes, and any other suitable information. Potential weighted score 34 for executive sponsor commitment risk factor 26a is one hundred (i.e. the product of importance value 28, ten, and maximum score 30, ten). Actual weighted score 36 for the executive sponsorship commitment risk factor 26a is ninety (i.e. the product of importance value 28, ten, and actual score 32, nine).

In this example, risk level 38 for executive sponsor commitment risk factor 26a is low. In the illustrated example embodiment, risk level 38 is determined by computing the calculated risk, the difference between potential weighted score 34 (one hundred) and actual weighted score 36 (ninety). This calculated risk (10) is divided by potential weighted score 34 (one hundred) to determine the risk ratio (10). The risk ratio is multiplied by one hundred to determine a percentage risk for the particular risk factor 26, in this case ten percent. In the example embodiment, risk factors 26 receive a risk level 38 of low for a percentage risk ranging from zero to twenty percent, a risk level 38 of medium for a percentage risk ranging from twenty to forty percent, and a risk level 38 of high for a percentage risk of greater than forty percent. However, any suitable ranges may be defined according to particular needs.

FIGS. 3B through 3F illustrate information pertaining to example risk factors 26 within other example risk factor categories 24. The table entries for FIGS. 3B through 3F are entered and calculated in the same manner as described above with reference to FIG. 3A. Although particular risk factors 26 and risk factor categories 24 are illustrated and described, the present invention contemplates any suitable risk factor categories 24 and constituent risk factors 26, in any suitable combination, according to particular needs.

Figure 3B:
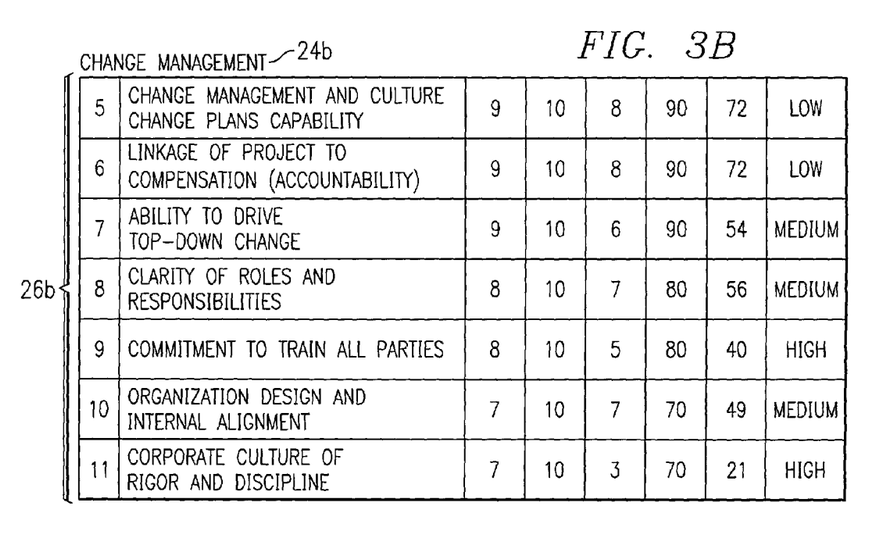

FIG. 3B illustrates information pertaining to example risk factors 26b within an example "Change Management" risk factor category 24b. In the illustrated example embodiment, risk factors 26b may include change management and culture change plans capability; linkage of the particular software implementation project to compensation (accountability); ability to drive top-down change; clarity of roles and responsibilities; commitment to train all parties; organization design and internal alignment; corporate culture of rigor and discipline; or any other suitable risk factors 26b in any suitable combination. For example, change management and culture change plans capability risk factor 26b might reflect whether a entity has the ability to manage business process changes to support the initiative across a decentralized organization; whether a customer has proven internal change management capability; whether the executives understand the importance of culture and behavior and their impact on the technology initiative; whether the executives are prepared to get outside objective expertise to help with change management; or any other suitable considerations.

The linkage of the software implementing entity's compensation risk factor 26b might reflect whether the executives understand the importance of linking initiative metrics to group and personal compensation; whether the organizations are willing to change compensation plans to better align with the technology initiative; whether the organizations are willing to publicly communicate the changes to the metrics and compensation plans; whether the organizations are willing to risk a significant percentage of variable compensation tied to the success of the technology initiative, or any other suitable considerations.

Ability to drive top-down change risk factor 26b might reflect whether the executive leadership team leads and drives change into the business; whether the top executives are taking an active role in the decision making process; whether the top executives are committed to drive the technology initiative and be actively involved; whether the metrics and compensation of the top executives are tied to the success of the technology initiative; whether the implementing entity and client executives are prepared to engage with the customer's executives to coach them through driving the change process; or any other suitable considerations.

Clarity of roles and responsibilities risk factor 26b might reflect whether the executives understand the importance of clear roles and responsibilities; whether the organization's roles and responsibilities have been defined, documented and communicated; whether the individual's roles and responsibilities have been defined, documented, and communicated; whether there is internal alignment and buy-in to the defined roles and responsibilities; or any other suitable considerations.

Commitment to train all parties risk factor 26b might reflect whether the executives understand the importance of training; whether the executives are willing to train all parties; whether the parties understand the importance of adequate training; whether the parties are willing to go through comprehensive training programs; whether there is a training budget in place to adequately train all parties; or any other suitable considerations.

Organization design and internal alignment risk factor 26b might reflect whether a supportive organizational design with alignment across multiple business units has been created; whether executives understand the importance of and the need for proper organizational design to support the technology initiative; whether there is internal or external expertise available to assess and change the organization structure, roles, and responsibilities; whether there is a process in place to get internal organization alignment and commitment to work together to lead the technology initiative; whether there is a proven process in place to resolve conflicts between the organizations; or any other suitable considerations.

Corporate culture of rigor and discipline risk factor 26b might reflect whether the organization has a proven track record of corporate rigor and discipline; whether the organization has demonstrated the ability to stick with long and difficult projects; whether the organization has a passion and commitment for the initiative; whether failure is an option; whether there is a process in place to identify stalls and break through them; or any other suitable considerations.

Figure 3C:
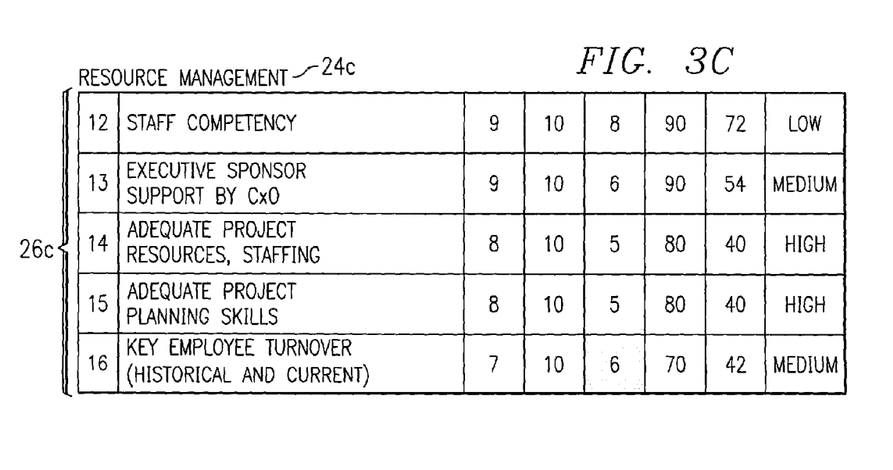

FIG. 3C illustrates information pertaining to example risk factors 26c within an example "Resource Management" risk factor category 24c. In the illustrated example embodiment, risk factors 26c may include staff competency; executive sponsor support by CxO; adequate project resources and staffing; adequate project training skills; key employee turnover (historical and current); or any other suitable risk factors 26c in any suitable combination. For example, staff competency risk factor 26c might reflect whether expectations on the qualifications and background of the user team are laid out; whether the people to be involved in the implementation of the technology initiative are above average or outstanding caliber individuals; whether the experiences and backgrounds of the individuals to be involved in the technology initiative are conducive to the task at hand; or any other suitable considerations.

Executive sponsor support by CxO risk factor 26c might reflect whether the CxO has identified a clear strong business owner for the project with direct accountability; whether the CxO is willing to fully back the business owner up; whether the business owner understands the strategic benefits of the software implementing entity's solution; whether the business owner is willing to drive down the change required and leverage his CEO connection; whether the business owner is well regarded within the company; whether the business owner has buy-in from the IT arm; or any other suitable considerations.

Adequate project resources and staffing risk factor 26c might reflect whether the executives understand the staffing required to make the technology initiative successful; whether the executives are willing to staff the initiative with adequate full time resources; whether the staffing requirements are clearly understood and documented; whether the staff are available; whether there is a budget in place to support the staffing requirements; or any other considerations.

Adequate project planning skills risk factor 26c might reflect whether the company leaders understand the importance of project planning skills; whether there is a commitment to create or refine project management skills; whether there is a resource identified to hone and refine project management skills; whether project management tools are available to the organizations; whether project milestones will be integrated into the initiative review process; or any other considerations.

Key employee turnover (historical and current) risk factor 26c might reflect whether all parties understand the impact that turnover will have on the technology initiative; whether turnover of involved organizations is at acceptable levels; whether there are circumstances in place that will increase future turnover; whether all parties are committed to manage turnover to acceptable levels; whether turnover is a metric that will be used to manage the technology initiative; or any other suitable considerations.

Figure 3D:
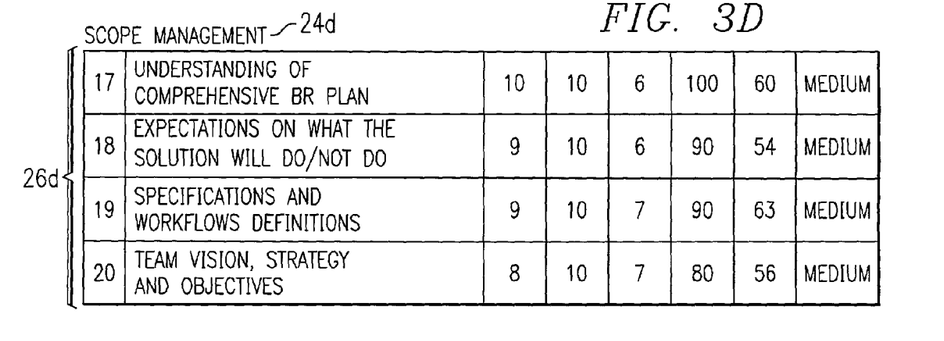

FIG. 3D illustrates information pertaining to example risk factors 26d within an example "Scope Management" risk factor category 24d. In the illustrated example embodiment, risk factors 26d may include understanding of comprehensive business release plan; expectations on what the solution will do and not do; specifications and workflows definitions; team vision, strategy, and objectives; or any other suitable risk factors 26d in any suitable combination. For example, understanding of comprehensive business release plan risk factor 26d may reflect whether the executives understand the concept and importance of a business release plan; whether all parties have participated in the creation of a comprehensive business release plan; whether the business release plan is constructed to drive rapid value to the customer; whether the business release plan is understood and supported by all parties; or any other suitable considerations.

Expectations on what the solution will do and not do risk factor 26d may reflect whether the extent of change management required for success is emphasized; whether the software complexity is emphasized; whether the potential need for workarounds is emphasized; whether there is an accurate understanding of the capabilities of the technology solution; whether all internal parties have similar expectations on what the solution will and will not do; whether the technology solutions capability was oversold; or any other suitable considerations.

Specifications and workflows risk factor 26d might reflect whether strong business release planning has been completed; whether there is adequate coordination among the presales, consulting, and customer teams; whether functional specifications and process workflows are in place and clearly defined; whether there are plans and resources in place to create needed specifications and workflows; or any other suitable considerations.

Team vision, strategy, and objectives risk factor category 26d might reflect whether there is a clear understanding and alignment as to the definition of value; whether there is a clearly articulated vision supported by all key organizations; whether there is a clearly articulated strategy in place supported by all key organizations; whether there is clarity and alignment around the objectives of the proposed technology initiative; or any other suitable considerations.

Figure 3E:
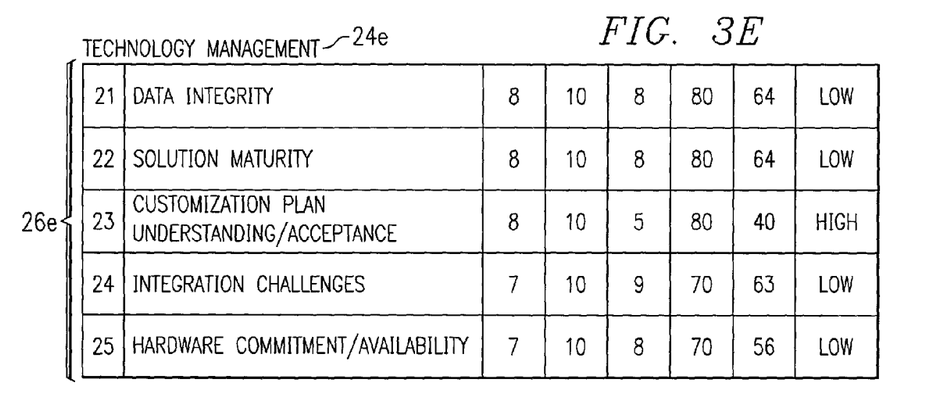

FIG. 3E illustrates information pertaining to example risk factors 26e within an example "Technology Management" risk factor category 24e. In the illustrated example embodiment, risk factors 26e may include data integrity; solution maturity; customization plan understanding/acceptance; integration challenges; hardware commitment and availability; or any other suitable risk factors 26e in any suitable combination. For example, data integrity risk factor 26e might reflect whether manpower requirements are minimized by the ability to automate the process of populating new tools with usable data; whether all parties understand what data integrity really means; whether all parties understand how data integrity impacts the technology initiative; whether data integrity has been assessed prior to choosing the solution set; whether there are plans and resources available to adequately address data integrity; or any other suitable considerations.

Solution maturity risk factor 26e may reflect whether the solution is mature, tested, and proven; whether the intended use of the solution will exceed its proven maturity; whether the sales teams are willing to tie there commission payments to the performance of the proposed solution; or any other suitable considerations.

Customization plan understanding and acceptance risk factor 26e might reflect whether the costs associated with customization have been weighed; whether all parties understand the risks and rewards of technology customization; whether there is a reasonable plan in place for technology customization; whether there is a plan in place to minimize the risk of customization; whether the are adequate resources to successfully complete the customization; or any other suitable considerations.

Integration challenges risk factor 26e might reflect whether integrating new tools to back-end legacy systems is complex; whether all parties understand integration and the importance of proper integration; whether there are any integration issues that represent risk to the technology initiative; whether there are adequate resources available to successfully integrate the technology to existing and planned systems; whether there is a process in place to resolve integration challenges as they occur; or any other suitable considerations.

Hardware commitment and availability risk factor 26e might reflect whether clear requirements for the hardware have been laid out; whether the client has adequate hardware capacity whether the client has adequate anticipation of the hardware requirements; whether the client has a budget for hardware; or any other suitable considerations.

Figure 3F:
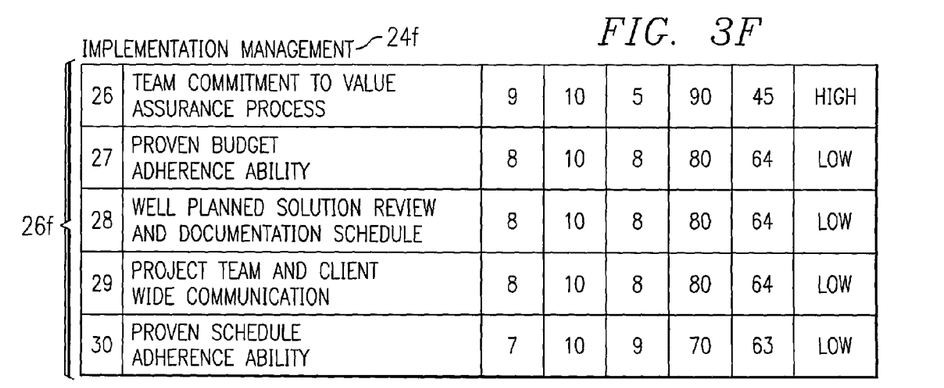

FIG. 3F illustrates information pertaining to example risk factors 26f within an example "Implementation Management" risk factor category 24f. In the illustrated example embodiment, risk factors 26f may include team commitment to value assurance process; proven budget adherence ability; well-planned solution review and documentation schedule; project team and client-wide communication; proven schedule adherence ability; or any other suitable risk factors 26f in any suitable combination. For example, team commitment to value assurance process risk factor 26f might reflect whether the client understands what the value assurance process means; whether the client is committed to having the intermediate checks to measure progress made against plan; or any other suitable considerations.

Proven budget adherence ability risk factor 26f may reflect whether the client has a clear plan in place to manage the project budget; whether the client has historically been able to stick to project budgets being managed internally; whether the client has historically been able to stick to project budgets involving external consultants; whether the client has the ability to justify additional funding should need arise; or any other suitable considerations.

Well-planned solution review and documentation schedule risk factor 26f might include measuring and tracking progress toward achieving value potential and meeting budgetary constraints. It may also reflect whether the client historically has a clear, planned schedule for reviewing solutions and progress made; whether the client historically has a clear documentation schedule, whether there is commitment that these solution reviews will be conducted at regular intervals; or any other suitable considerations.

Project team and client-wide communication risk factor 26f may reflect whether all stakeholders are kept informed of progress and barriers with clear details of actions required; whether the communication channels within the organization are clearly set up; whether the C×Os are approachable with issues that may arise during implementation; or any other suitable considerations.

Proven schedule adherence ability risk factor 26f may reflect whether the client has a clear plan in place to manage the project schedule, whether the client historically has been able to stick to project schedules being managed internally, whether the client has historically been able to stick to project schedules being managed by external consultants.

Figure 4:
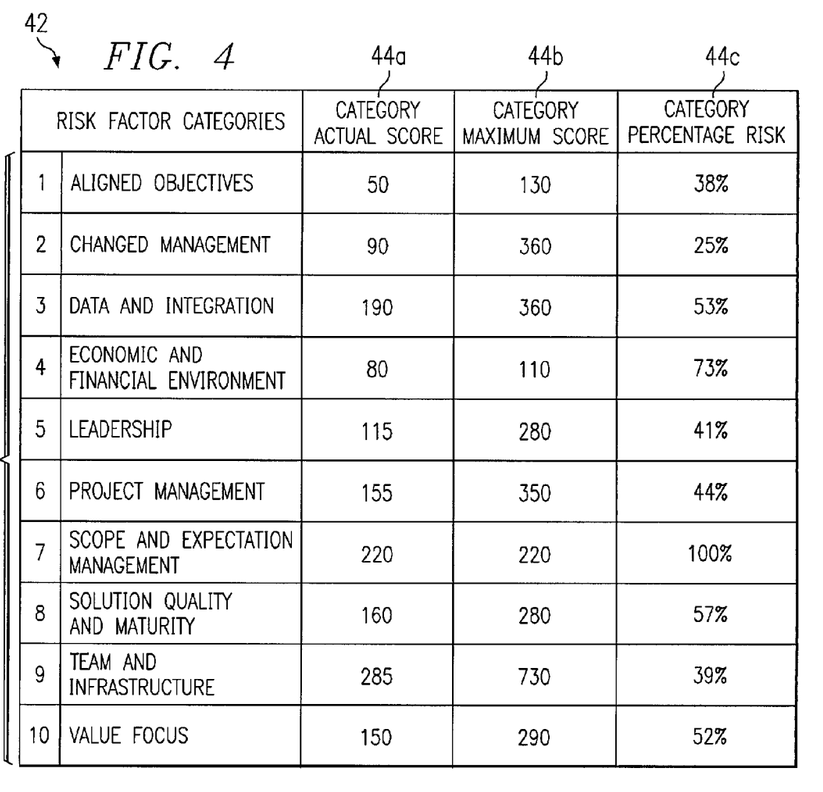
FIG. 4 illustrates an example risk factor category scorecard.

FIG. 4 illustrates an example risk factor category scorecard 42, which provides a summary of the results for a risk assessment for a particular software implementation project. In one embodiment, the first column of risk factor category scorecard 42 contains the applicable risk factor categories 24. Example risk factor categories 24 may include Aligned Objectives, Change Management, Data and Integration, Economic and Financial Environment, Leadership, Project Management, Scope and Expectation Management, Solution Quality and Maturity, Team and Infrastructure, and Value Focus. In a preferred embodiment, risk factor category scorecard 42 includes all risk factor categories 24 from risk assessment scorecard 22, though risk factor category scorecard 42 may include any risk factor categories 24 deemed appropriate by the implementing entity. Columns two through four may include various scores and percentages for each risk factor category 24. The second column may include a category actual score 44a for each risk factor category 24. Category actual score 44a may represent the sum of actual scores 32 for all risk factors 26 within a particular risk factor category 24. The third column may include a category maximum score 44b for each risk factor category 24. Category maximum score 44b may reflect the sum of maximum scores 30 for all risk factors 26 within a particular risk factor category 24. The fourth column may include a category percentage risk 44c for each risk factor category 24. Category percentage risk 44c may be computed for a particular risk factor category 24 by subtracting category actual score 44a from category maximum score 44b, dividing the resulting difference by category maximum score 44b, and multiplying the resulting quotient by one hundred to obtain a percentage. A category percentage risk 44c may be computed for any number of risk factor categories 24, incorporating any number of risk factors 26. Category percentage risk 44c provides an indicator of which risk factor categories 24 are most likely to jeopardize the success of the software implementation project.

Figure 5:
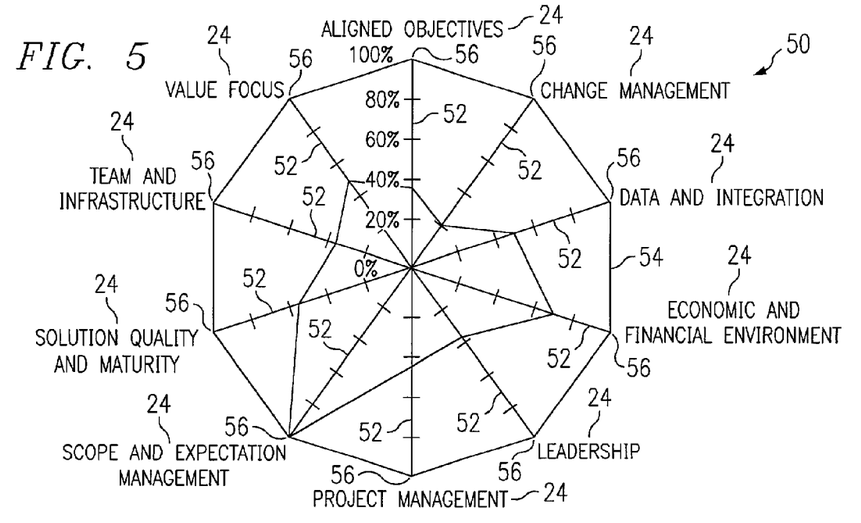
FIG. 5 illustrates an example risk factor category spider chart.

FIG. 5 illustrates an example risk factor category spider chart 50. Spider charts, in general, display the performance of multiple variables in a single display providing readily interpretable data. In the illustrated example embodiment, risk factor category spider chart 50 illustrates category percentage risks 44c from risk factor category scorecard 42. In a preferred embodiment, a polygon 54 within risk factor category spider chart 50 has a number of sides equal to the number of risk factor categories 24 represented in risk factor category scorecard 42, although any suitable number of risk factor categories 24 may be represented. A ray 52 from the origin of polygon 54 to each of its vertices 56 illustrates a uniform spectrum of percentages with the origin representing zero percent and each vertex 56 representing one hundred percent. Each ray 52 is marked at the percentage coinciding with the category percentage risk 44c for the risk factor category 24 associated with the particular ray 52. The marked point for each risk factor category 24 is connected to the marked points for adjacent risk factor categories 24 to create an enclosed area. In this particular embodiment, because there are ten risk factor categories 24 in risk factor category scorecard 42, risk factor category spider chart 50 includes a decagon with one risk factor category 24 represented using each ray 52. The present invention contemplates risk factor category spider chart 50 illustrating any appropriate number of risk factor categories 24. Risk factor category spider chart 50 provides an alternative or additional visualization of risk factor category scorecard 42. Using risk factor category spider chart 50, a user may readily identify the risk factor categories 24 that are most likely to jeopardize the success of a particular software implementation project if not adequately addressed. As opposed to the list of category percentage risks 44c provided in risk factor category scorecard 42, risk factor category spider chart 50 may provide a clearer indication of the most critical risk factor categories 24. A spider chart may similarly be provided to represent the percentage risks for risk factors 26 within a particular risk factor category 24 or any other suitable set of risk factors 26.

Figure 6A:
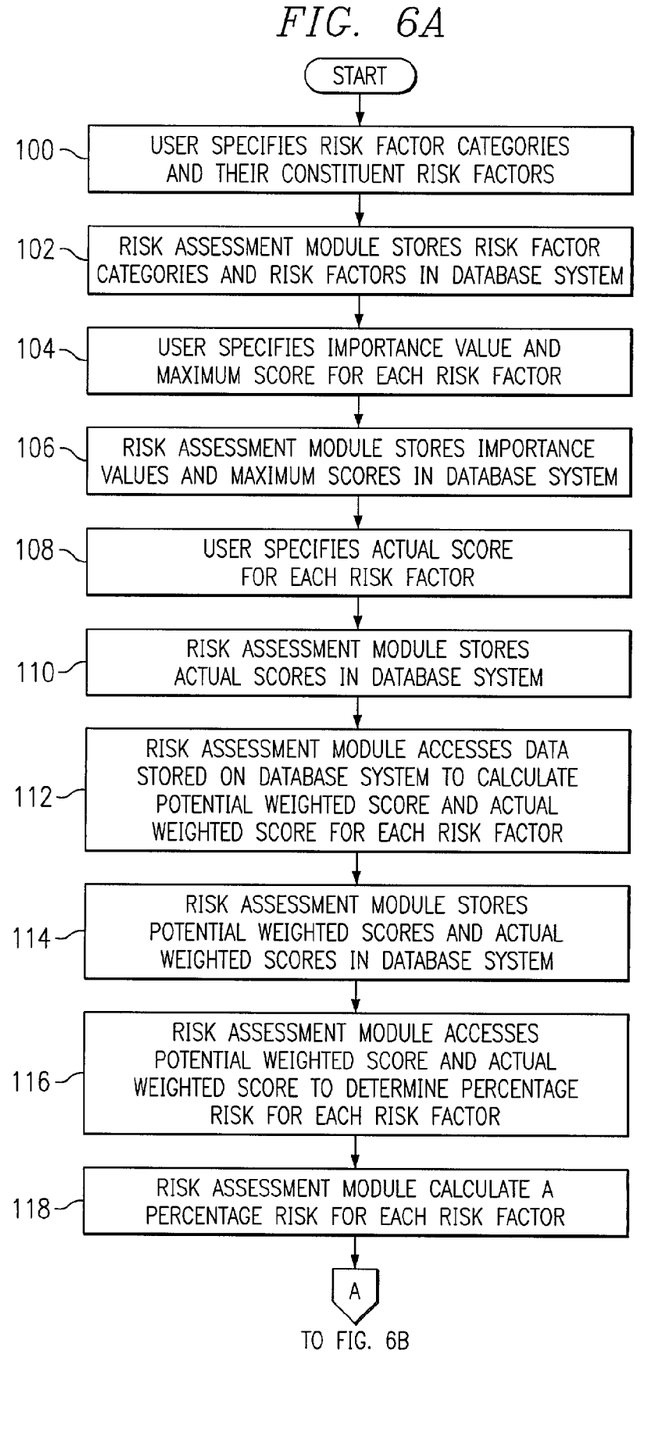
FIG. 6 illustrates an example method for generating a risk assessment regarding a software implementation project.
Figure 6B:
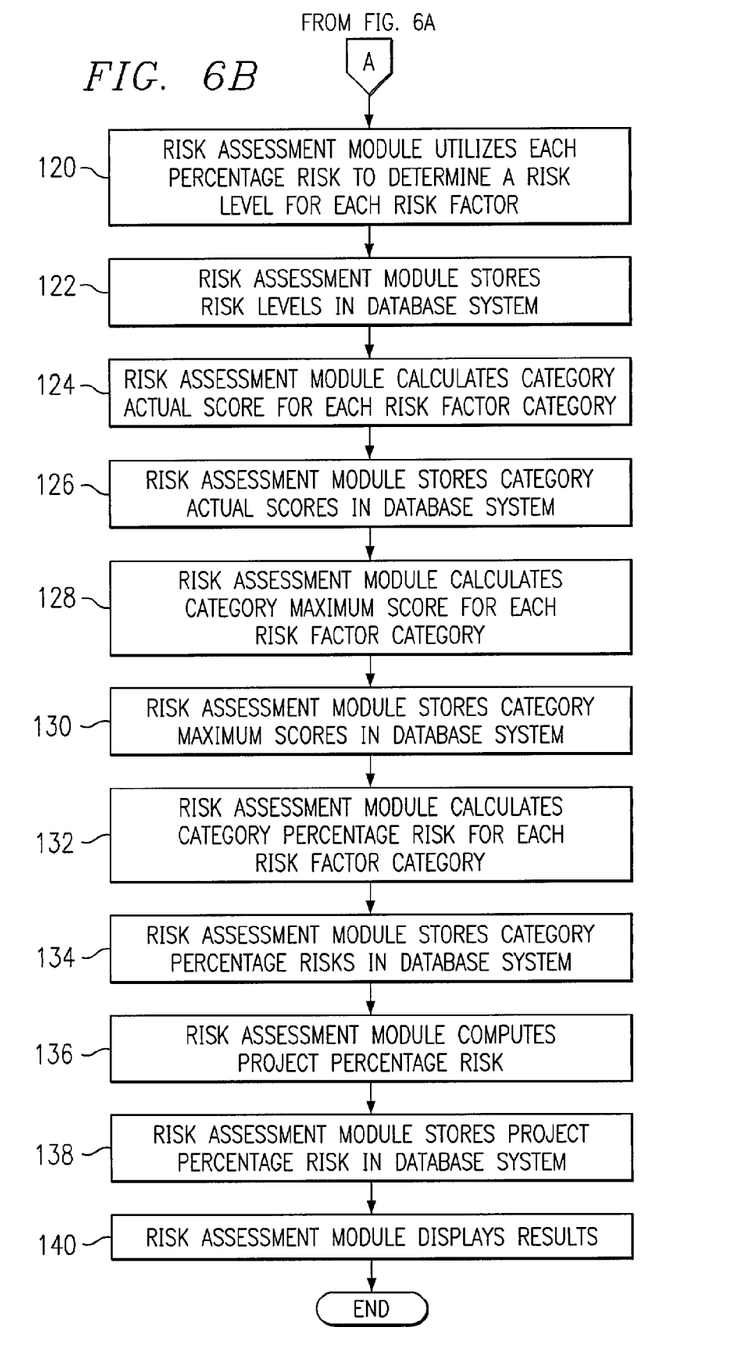

FIG. 6 illustrates an example method for generating a risk assessment regarding a software implementation project. At step 100, a user associated with the implementing entity specifies risk factor categories 24 and their constituent risk factors 26. At step 102, risk assessment module 18 stores risk factor categories 24 and risk factors 26 in database system 16, for example, in association with object class 20a. At step 104, the same or a different user associated with the implementing entity specifies the importance values 28 and maximum scores 30 for each risk factor 26. In a preferred embodiment, the implementing entity predetermines risk factor categories 24, risk factors 26, importance values 28, and maximum scores 30 based on its experience with previous software implementation projects, these preferably being the same across risk assessments for substantially all software implementation projects. At step 106, risk assessment module 18 stores importance values 28 and maximum scores 30 in database system 16, for example, in association with object class 20b. At step 108, the same or a different user associated with the implementing entity specifies actual score 32 for each risk factor 26 for the particular software implementation project and, at step 110, risk assessment module 18 stores actual scores 32 in database system 16, for example, in association with object class 20c. The implementing entity preferably determines actual score 32 based on its experience in conducting software implementation projects, following an analysis of client resources and capabilities relevant to the corresponding risk factor 26. Information described above may be supplied by one or more users in any suitable order using any suitable data entry techniques.

In one embodiment, at step 112, risk assessment module 18 accesses data stored in database system 16, in association with object classes 20a, 20b, and 20c for example, to calculate potential weighted score 34 and actual weighted score 36. As described above, for each risk factor 26, risk assessment module 18, one or more associated scripts, or another appropriate software component multiplies importance value 28 by maximum score 30 to obtain potential weighted score 34 and multiplies importance value 28 by actual score 32 to obtain actual weighted score 36. At step 114, risk assessment module 18 stores potential weighted score 34 and actual weighted score 36 in database system 16, for example, in association with object classes 20b and 20c, respectively.

At step 116, risk assessment module 18 accesses potential weighted score 34 and actual weighted score 36 for determination of a relationship between these values. In one embodiment, as described above, a calculated risk is determined by subtracting actual weighted score 36 from potential weighted score 34. The calculated risk is divided by the potential weighted score 34 to determine a risk ratio, which is multiplied by one hundred to determine a percentage risk for each risk factor at step 118. At step 120, each percentage risk is used by risk assessment module 18 to determine risk level 38 for the corresponding risk factor 26. At step 122, risk assessment module 18 stores risk level 38 for each risk factor 26 within database system 16, for example, in association with object class 20d.

At step 124, risk assessment module 18 sums the actual scores for all risk factors 26 within a particular risk factor category 24 to calculate a category actual score 44a for the particular risk factor category 24. Step 124 is repeated for each risk factor category 24. At step 126, risk assessment module 18 stores category actual score 44a in database system 16, for example, in association with object class 20d. At step 128, risk assessment module 18 sums the maximum scores for all risk factors 26 within a particular risk factor category 24 to calculate a category maximum score 44b for the particular risk factor category 24. Step 128 is repeated for each risk factor category 24. At step 130, risk assessment module 18 stores category maximum score 44b in database system 16, for example, in association with object class 20d. At step 132, risk assessment module 18 calculates category percentage risk 44c by subtracting category actual score 44a from category maximum score 44b, dividing the resulting difference by category maximum score 44b, and multiplying the resulting quotient by one hundred to obtain a percentage. Steps 132 and 134 may be repeated for any number of risk factor categories 24. At step 134, risk assessment module 18 stores category percentage risk 44c in database system 16, for example, in association with object class 20d. At step 136, risk assessment module 18 calculates project percentage risk 34. In one embodiment, this is done by computing the sum of actual scores 32 for all risk factors 26 in a particular risk assessment to obtain a project actual score, the sum of maximum scores 30 for all risk factors 26 in a particular risk assessment to obtain a project maximum score, the difference between the project maximum score and the project actual score, the quotient of the resulting difference and the project maximum score, and the product of the resulting difference and one hundred to obtain a percentage. At step 138, project percentage risk 34 is stored in database system 16, for example, in association with object class 20d.

At step 140, risk assessment module 18 generates risk assessment results in one or more appropriate formats. In one embodiment, risk assessment results are generated for display in spreadsheet format using risk assessment scorecard 30 and risk factor category scorecard 40. The results for risk factor categories 24 may appear in risk factor category scorecard 40 as depicted in FIG. 4. Risk assessment module 18 may, instead or in addition to generating risk factor category scorecard 40, generate results for risk factor categories 24 for display using risk factor spider chart 50 as depicted in FIG. 5. These formats may provide an effective visualization of the risk assessment results to best inform a client of the potential problem areas for the software implementation project, enabling the proactive identification of critical risk factors 26 (e.g., those for which the risk level 38 is high or very high) and risk factor categories 24 (e.g., those for which category percentage risk 44c is relatively high).

Once these critical risk factors 26 and risk factor categories 24 are identified, they may be closely monitored before and throughout the software implementation project, allowing the client and the implementing entity to focus more clearly on the key potential barriers to a successful implementation. Furthermore, clear identification of critical risk factors 26 and risk factor categories 24 may help to shelter the implementing entity from unwarranted responsibility for an unsuccessful implementation, because the risk assessment fully informs the client of the key risk factors 26 and risk factor categories 24 (and its obligations in addressing those key risk factors 26 and risk factor categories 24) before the software implementation project begins and as it progresses. Ultimately, the goal of risk assessment according to the present invention is to increase the potential for a successful software implementation for a client.

Although the present invention has been described in several embodiments, diverse changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A computer-implemented system for generating a risk assessment regarding a software implementation project, the system comprising one or more computer systems each comprising one or more processing units programmed with one or more software components to:

access a previously specified importance value and maximum score for each of a plurality of risk factors, the importance value for each risk factor reflecting experience of an implementing entity regarding the extent to which the risk factor may negatively impact a software implementation project if the risk factor is not adequately addressed, the importance value and maximum score for each risk factor being multiplied to define a potential weighted score for the risk factor;

receive an actual score for a particular software implementation project for each risk factor based on an analysis by the implementing entity specific to the particular software implementation project;

generate an actual weighted score for the particular software implementation project for each risk factor by multiplying the importance value and actual score for the risk factor;

determine a relationship between the potential weighted score and the actual weighted score for each risk factor;

assign a risk level for the particular software implementation project to each risk factor according to the relationship between the potential weighted score and the actual weighted score for the risk factor, the risk level for each risk factor representing an assessment by the implementing entity regarding the extent to which the risk factor may negatively impact the particular software implementation project if the risk factor is not adequately addressed;

generate a risk assessment for the particular software implementation project comprising one or more of the assigned risk levels for the particular software implementation project for one or more corresponding risk factors, wherein each risk factor is associated with one of a plurality of risk factor categories, each risk factor category comprising one or more risk factors; and generate a risk factor category scorecard for display, the risk factor category scorecard providing at least one of a plurality of risk factor categories and data associated with each of the plurality of risk factor categories, the data selected from the group consisting of a category actual score, a category maximum score, and a category percentage risk, wherein the category percentage risk is determined by:
determining a quotient of the category actual score and the category maximum score, the category actual score reflecting the sum of the actual scores of all risk factors within a risk factor category, the category maximum score reflecting the sum of the maximum scores of all risk factors within a risk factor category;
determining the quotient by dividing the category actual score by the category maximum score; and
determining the category percentage risk by multiplying the quotient by one hundred.

2. The system of claim 1, wherein the software components are further operable to generate a risk assessment scorecard for display, the risk assessment scorecard providing the risk factors and the importance value, maximum score, potential weighted score, actual score, actual weighted score, and risk level for each risk factor in a spreadsheet format.

3. The system of claim 1, wherein:
the maximum score is the same for each risk factor; and
the importance value and maximum score for a risk factor remain constant across multiple software implementation projects.

4. The system of claim 1, wherein the one or more software components are collectively operable to generate a risk factor category spider chart for display, the spider chart comprising a polygon with a number of sides equal to the number of risk factor categories, each pair of sides meeting at a vertex, a ray to each vertex reflecting a range of category percentage risks for a corresponding risk factor category, a data point on a particular ray reflecting the category percentage risk for the corresponding risk factor category.

5. The system of claim 1, wherein the implementing entity is a seller of software to be implemented in the particular software implementation project at one or more sites of a client.

6. The system of claim 5, wherein the actual score for a risk factor is determined by the implementing entity and is based on an evaluation of client resources and capabilities relevant to the risk factor.

7. The system of claim 1, wherein the relationship between the potential weighted score and the actual weighted score for each risk factor, determining assignment of the risk level for the risk factor, is a percentage based on one minus the quotient of the actual weighted score and the potential weighted score for each risk factor.

8. The system of claim 1, wherein the maximum score is a maximum attainable score.

9. A computer-implemented method for generating a risk assessment regarding a software implementation project, the method comprising:
accessing a previously specified importance value and maximum score for each of a plurality of risk factors, the importance value for each risk factor reflecting experience of an implementing entity regarding the extent to which the risk factor may negatively impact a software implementation project if the risk factor is not adequately addressed, the importance value and maximum score for each risk factor being multiplied to define a potential weighted score for the risk factor;
receiving an actual score for a particular software implementation project for each risk factor based on an analysis by the implementing entity specific to the particular software implementation project;
generating an actual weighted score for the particular software implementation project for each risk factor by multiplying the importance value and actual score for the risk factor;
determining a relationship between the potential weighted score and the actual weighted score for each risk factor;
assigning a risk level for the particular software implementation project to each risk factor according to the relationship between the potential weighted score and the actual weighted score for the risk factor, the risk level for each risk factor representing an assessment by the implementing entity regarding the extent to which the risk factor may negatively impact the particular software implementation project if the risk factor is not adequately addressed;
generating a risk assessment for the particular software implementation project comprising one or more of the assigned risk levels for the particular software implementation project for one or more corresponding risk factors, wherein each risk factor is associated with one of a plurality of risk factor categories, each risk factor category comprising one or more risk factors; and
generating a risk factor category scorecard for display, the risk factor category scorecard providing at least one of a plurality of risk factor categories and data associated with each of the plurality of risk factor categories, the data selected from the group consisting of a category actual score, a category maximum score, and a category percentage risk, wherein the category percentage risk is determined by:
determining a quotient of the category actual score and the category maximum score, the category actual score reflecting the sum of the actual scores of all risk factors within a risk factor category, the category maximum score reflecting the sum of the maximum scores of all risk factors within a risk factor category;
determining the quotient by dividing the category actual score by the category maximum score; and
determining the category percentage risk by multiplying the quotient by one hundred.

10. The method of claim 9, further comprising generating a risk assessment scorecard for display, the risk assessment scorecard providing the risk factors and the importance value, maximum score, potential weighted score, actual score, actual weighted score, and risk level for each risk factor in a spreadsheet format.

11. The method of claim 9, wherein:
the maximum score is the same for each risk factor; and
the importance value and maximum score for a risk factor remain constant across multiple software implementation projects.

12. The method of claim 9, further comprising generating a risk factor category spider chart for display, the spider chart comprising a polygon with a number of sides equal to the number of risk factor categories, each pair of sides meeting at a vertex, a ray to each vertex reflecting a range of category percentage risks for a corresponding risk factor category, a data point on a particular ray reflecting the category percentage risk for the corresponding risk factor category.

13. The method of claim 9, wherein the implementing entity is a seller of software to be implemented in the particular software implementation project at one or more sites of a client.

14. The method of claim 13, wherein the actual score for a risk factor is determined by the implementing entity and is based on an evaluation of client resources and capabilities relevant to the risk factor.

15. The method of claim 9, wherein the relationship between the potential weighted score and the actual weighted score for each risk factor, determining assignment of the risk level for the risk factor, is a percentage based on one minus the quotient of the actual weighted score and the potential weighted score for each risk factor.

16. The method of claim 9, wherein the maximum score is a maximum attainable score.

17. Software for generating a risk assessment regarding a software implementation project, the software being embodied in computer-readable media and when executed operable to:
- access a previously specified importance value and maximum score for each of a plurality of risk factors, the importance value for each risk factor reflecting experience of an implementing entity regarding the extent to which the risk factor may negatively impact a software implementation project if the risk factor is not adequately addressed, the importance value and maximum score for each risk factor being multiplied to define a potential weighted score for the risk factor;
- receive an actual score for a particular software implementation project for each risk factor based on an analysis by the implementing entity specific to the particular software implementation project;
- generate an actual weighted score for the particular software implementation project for each risk factor by multiplying the importance value and actual score for the risk factor;
- determine a relationship between the potential weighted score and the actual weighted score for each risk factor;
- assign a risk level for the particular software implementation project to each risk factor according to the relationship between the potential weighted score and the actual weighted score for the risk factor, the risk level for each risk factor representing an assessment by the implementing entity regarding the extent to which the risk factor may negatively impact the particular software implementation project if the risk factor is not adequately addressed;
- generate a risk assessment for the particular software implementation project comprising one or more of the assigned risk levels for the particular software implementation project for one or more corresponding risk factors, wherein each risk factor is associated with one of a plurality of risk factor categories, each risk factor category comprising one or more risk factors; and
- generate a risk factor category scorecard for display, the risk factor category scorecard providing at least one of a plurality of risk factor categories and data associated with each of the plurality of risk factor categories, the data selected from the group consisting of a category actual score, a category maximum score, and a category percentage risk,
- wherein the category percentage risk is determined by:
  - determining a quotient of the category actual score and the category maximum score, the category actual score reflecting the sum of the actual scores of all risk factors within a risk factor category, the category maximum score reflecting the sum of the maximum scores of all risk factors within a risk factor category;
  - determining the quotient by dividing the category actual score by the category maximum score; and
  - determining the category percentage risk by multiplying the quotient by one hundred.

18. The software of claim 17, further operable to generate a risk assessment scorecard for display, the risk assessment scorecard providing the risk factors and the importance value, maximum score, potential weighted score, actual score, actual weighted score, and risk level for each risk factor in a spreadsheet format.

19. The software of claim 17, wherein:
- the maximum score is the same for each risk factor; and
- the importance value and maximum score for a risk factor remain constant across multiple software implementation projects.

20. The software of claim 17, further operable to generate a risk factor category spider chart for display, the spider chart comprising a polygon with a number of sides equal to the number of risk factor categories, each pair of sides meeting at a vertex, a ray to each vertex reflecting a range of category percentage risks for a corresponding risk factor category, a data point on a particular ray reflecting the category percentage risk for the corresponding risk factor category.

21. The software of claim 17, wherein the implementing entity is a seller of software to be implemented in the particular software implementation project at one or more sites of a client.

22. The software of claim 21, wherein the actual score for a risk factor is determined by the implementing entity and is based on an evaluation of client resources and capabilities relevant to the risk factor.

23. The software of claim 17, wherein the relationship between the potential weighted score and the actual weighted score for each risk factor, determining assignment of the risk level for the risk factor, is a percentage based on one minus the quotient of the actual weighted score and the potential weighted score for each risk factor.

24. The software of claim 17, wherein the maximum score is a maximum attainable score.

25. A system for generating a risk assessment regarding a software implementation project, the system comprising:
- means for accessing a previously specified importance value and maximum score for each of a plurality of risk factors, the importance value for each risk factor reflecting experience of an implementing entity regarding the extent to which the risk factor may negatively impact a software implementation project if the risk factor is not adequately addressed, the importance value and maximum score for each risk factor being multiplied to define a potential weighted score for the risk factor;
- means for receiving an actual score for a particular software implementation project for each risk factor based on an analysis by the implementing entity specific to the particular software implementation project;
- means for generating an actual weighted score for the particular software implementation project for each risk factor by multiplying the importance value and actual score for the risk factor;
- means for determining a relationship between the potential weighted score and the actual weighted score for each risk factor;
- means for assigning a risk level for the particular software implementation project to each risk factor according to the relationship between the potential weighted score and the actual weighted score for the risk factor, the risk level for each risk factor representing an assessment by the implementing entity regarding the extent to which the risk factor may negatively impact the particular software implementation project if the risk factor is not adequately addressed;

means for generating a risk assessment for the particular software implementation project comprising one or more of the assigned risk levels for the particular software implementation project for one or more corresponding risk factors, wherein each risk factor is associated with one of a plurality of risk factor categories, each risk factor category comprising one or more risk factors; and means for generating a risk factor category scorecard for display, the risk factor category scorecard providing at least one of a plurality of risk factor categories and data associated with each of the plurality of risk factor categories, the data selected from the group consisting of a category actual score, a category maximum score, and a category percentage risk, wherein the category percentage risk is determined by:
   determining a quotient of the category actual score and the category maximum score, the category actual score reflecting the sum of the actual scores of all risk factors within a risk factor category, the category maximum score reflecting the sum of the maximum scores of all risk factors within a risk factor category;
   determining the quotient by dividing the category actual score by the category maximum score; and
   determining the category percentage risk by multiplying the quotient by one hundred.

26. A system for generating a risk assessment regarding a software implementation project, comprising:

means for accessing a previously specified importance value and maximum score for each of a plurality of risk factors, the importance value for each risk factor reflecting experience of an implementing entity regarding the extent to which the risk factor may negatively impact a software implementation project if the risk factor is not adequately addressed, the importance value being the same for a risk factor across all software implementations, the maximum score being the same for each risk factor across all software implementation projects, the importance value and maximum score for each risk factor being multiplied to define a potential weighted score for the risk factor, each risk factor being associated with one of a plurality of risk factor categories each comprising one or more risk factors;

means for receiving an actual score for a particular software implementation project for each risk factor based on an analysis by the implementing entity specific to the particular software implementation project, the analysis for each risk factor comprising an evaluation of client resources and capabilities relevant to the risk factor;

means for generating an actual weighted score for the particular software implementation project for each risk factor by multiplying the importance value and actual score for the risk factor;

means for determining a relationship between the potential weighted score and the actual weighted score for each risk factor;

means for assigning a risk level for the particular software implementation project to each risk factor according to the relationship between the potential weighted score and the actual weighted score for the risk factor, the risk level for each risk factor representing an assessment by the implementing entity regarding the extent to which the risk factor may negatively impact the particular software implementation project if the risk factor is not adequately addressed; and means for generating a risk factor category scorecard for display, the risk factor category scorecard providing at least one of a plurality of risk factor categories and data associated with each of the plurality of risk factor categories, the data selected from the group consisting of a category actual score, a category maximum score, and a category percentage risk, wherein the category percentage risk is determined by:
   means for determining a quotient of the category actual score and the category maximum score, the category actual score reflecting the sum of the actual scores of all risk factors within a risk factor category, the category maximum score reflecting the sum of the maximum scores of all risk factors within a risk factor category;
   means for determining the quotient by dividing the category actual score by the category maximum score; and
   means for determining the category percentage risk by multiplying the quotient by one hundred.

* * * * *